W. Wickersham.
Sewing Machine.
Nº 18069. Patented Aug. 25, 1857.
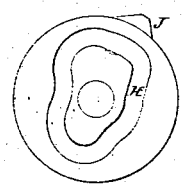
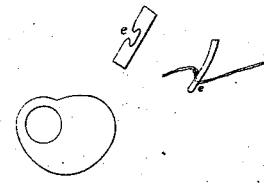
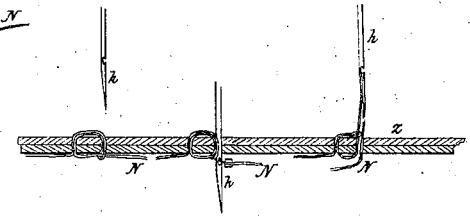
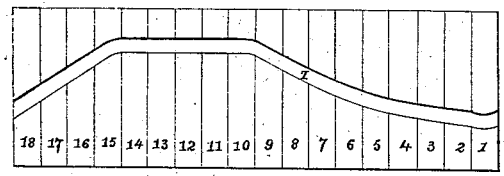
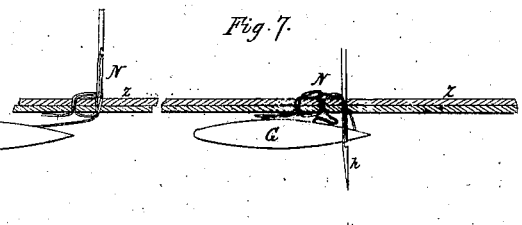
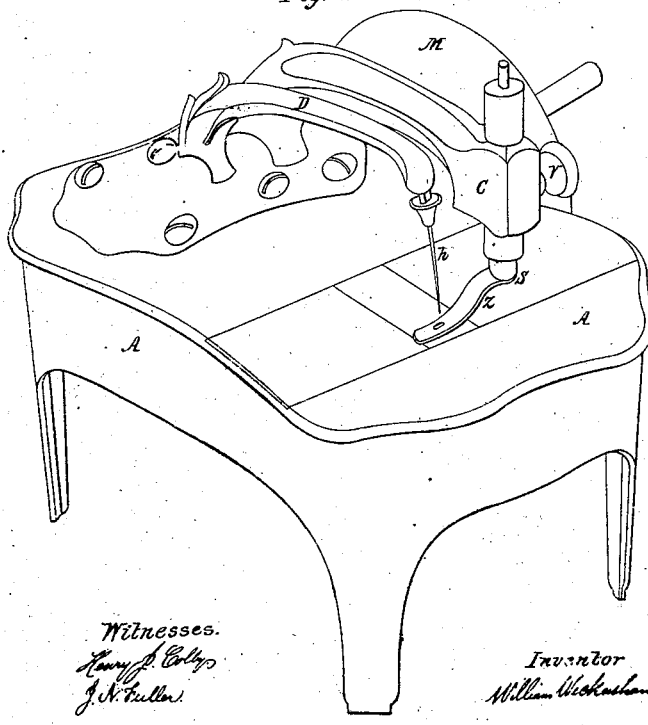
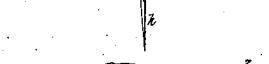
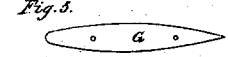
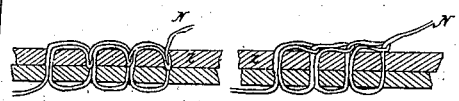
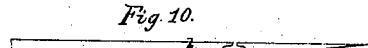
Witnesses.
Henry J. Colby
J. N. Fuller
Inventor
William Wickersham

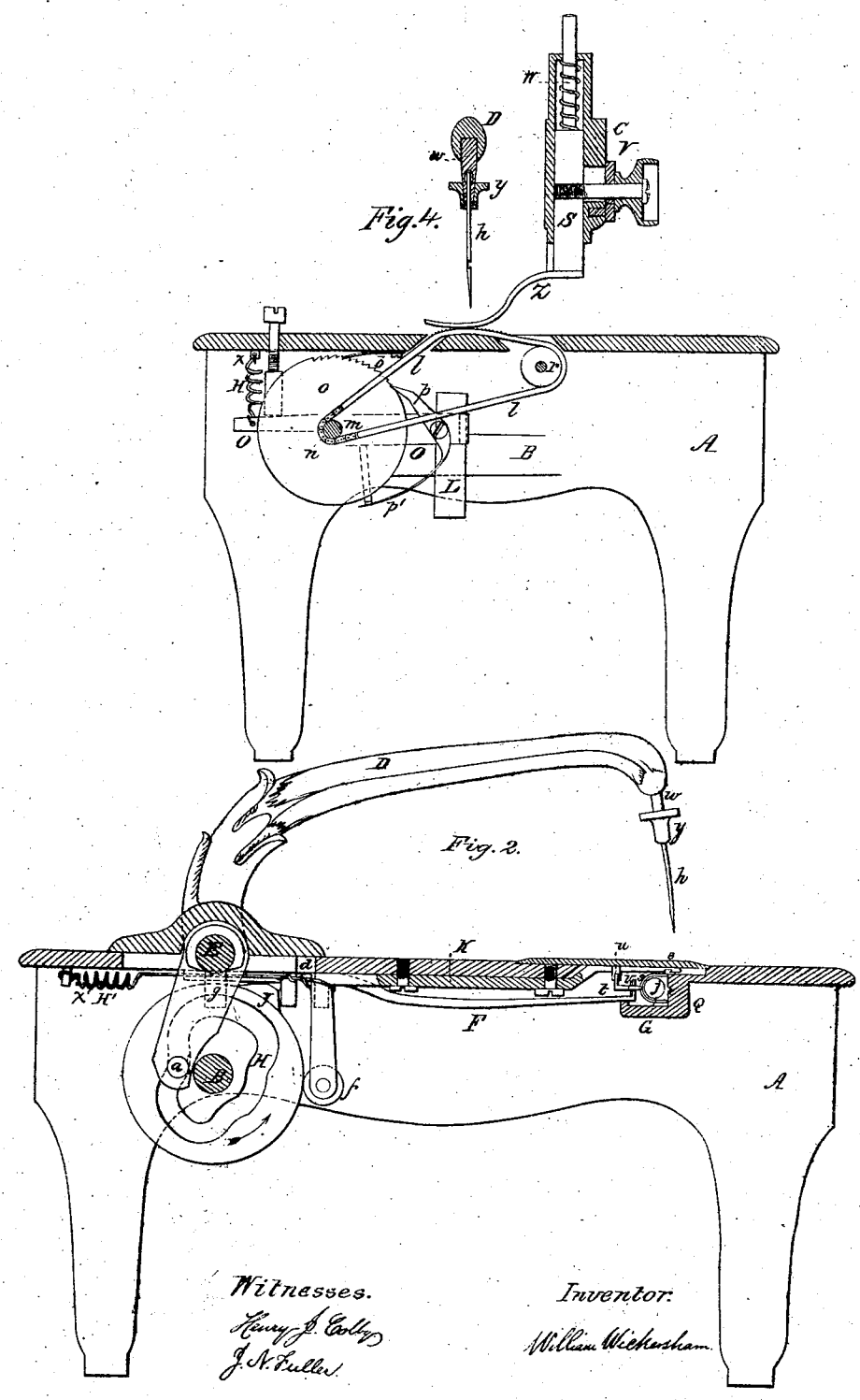

W. Wickersham.
Sewing Machine.
Nº 18069.    Patented Aug. 25, 1857.
Fig. 6.
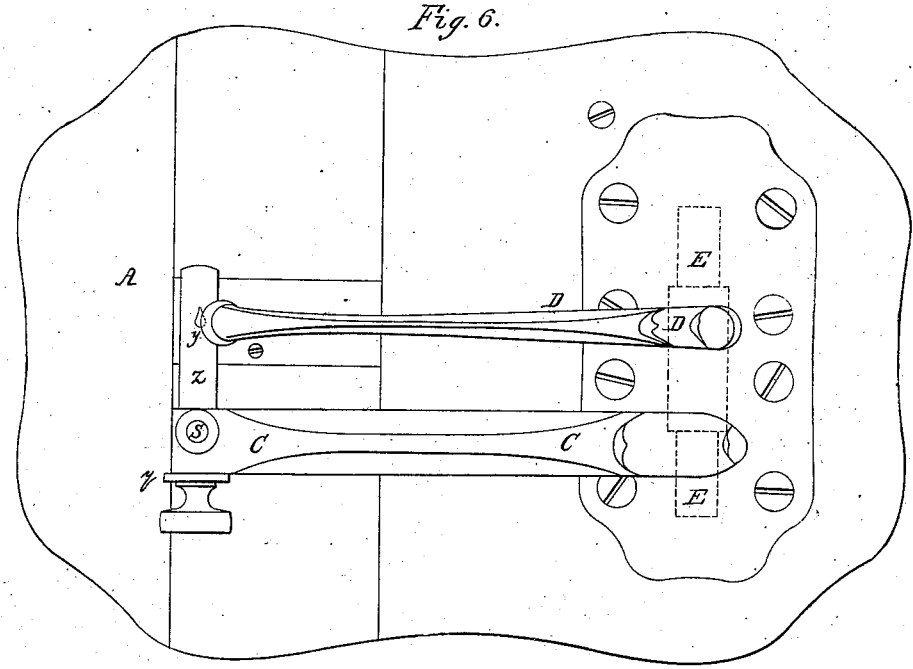
Fig. 3.
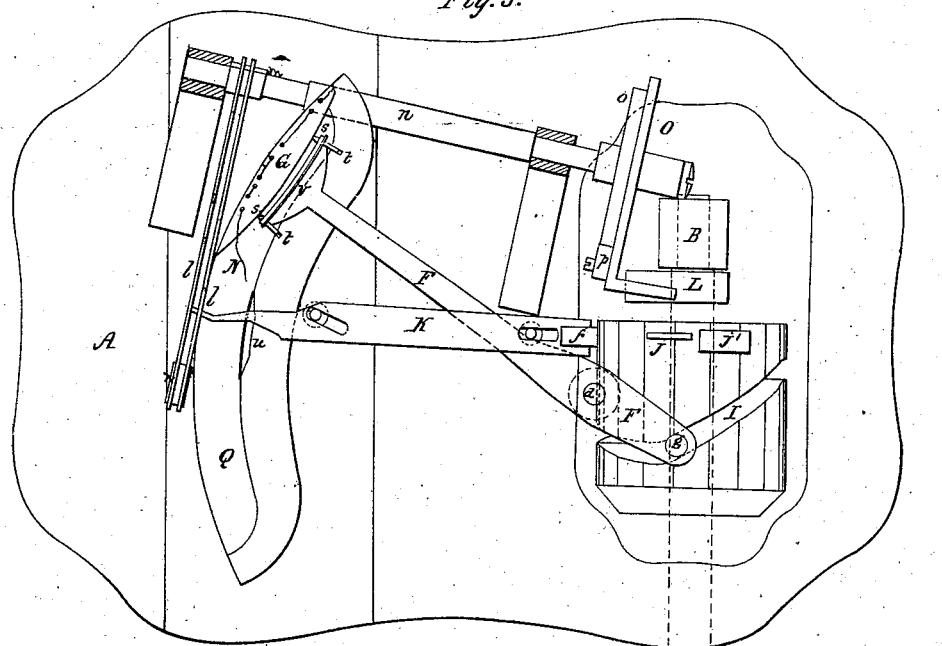
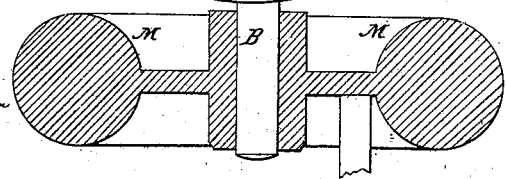
Witnesses.    Inventor.
Henry P. Colby    William Wickersham
J. N. Fuller.

UNITED STATES PATENT OFFICE.

WILLIAM WICKERSHAM, OF BOSTON, MASSACHUSETTS.

IMPROVEMENT IN SEWING-MACHINES.

Specification forming part of Letters Patent No. 18,069, dated August 25, 1857.

*To all whom it may concern:*

Be it known that I, WILLIAM WICKERSHAM, of Boston, in the county of Suffolk and State of Massachusetts, have invented new and useful Improvements in Sewing-Machines; and I do hereby declare that the following is a full and exact description of the construction and operation of the same, reference being had to the annexed drawings, making a part of this specification, in which—

Figure 1 is a perspective view. Fig. 2 is a side sectional view, showing a portion of the machinery or parts arranged in their working position. Fig. 3 is a top view of the machine as it would appear if the upper part of the stand or table were removed. Fig. 4 is a cross-section of the front part of the machine, showing the cloth-holder z and the apparatus for raising it and pressing it into the cloth. It shows the needle and its attachment to the needle-bar D. It also shows the feeding apparatus. Fig. 5 illustrates the shuttle. Fig. 6 gives a top view of the machine. Fig. 7 shows the formation of the stitch in its different stages until completed; also, it shows the end of the thread-guide which throws the thread into the eye of the needle, on a large scale. Fig. 8 is a surface view of the cams, showing their forms. Fig. 9 shows the stitch which my machine makes, on a large scale. Fig. 10 shows the needle on a large scale.

In specifying my machine the same letters will designate the same parts in the different drawings as follows:

A represents the table or stand to which the different parts of the machine are attached. B is the main shaft. C is an arm fastened upon the table which contains the cloth-holder and the apparatus for working it. D is the needle-arm. E is a shaft to which the needle-arm is connected. F is a lever, which moves the shuttle. G is the shuttle. H is a cam, which gives the needle-arm D and the needle $h$ their requisite motion. I is the cam which moves the lever F and the shuttle. J is the cam which moves the thread-guide K. L is the cam which gives the feed motion. M is the fly-wheel and crank. N is the thread. O is the feed-lever, operated by the cam L. Q is a groove or way suitably formed for the shuttle to play in. S is a bar or rod fitted movably into the end of the arm C, with a foot, $z$, on the lower end, to hold the cloth firm while being sewed. V is a small cam to raise the cloth-holder $z$ off the cloth. W is a spring to hold said cloth-holder down while the cloth is being fed along underneath it. H is a spring to throw the feed-lever into its first position after it has been moved by the feed-cam L. H' is a spring to draw the thread-guide F into its first position after it has thrown the thread into the eye of the needle. $z$ is the foot on the cloth-holder. $e$ is a small notch in the end of the thread-guide K, to hold the thread while being guided into the needle-hook. $h$ is the needle, shown on a large scale at Fig. 10. $i$ is a small spring to give tension to the thread as it passes between said spring and the side of the shuttle. $j$ is the bobbin or spindle, with the thread wound onto it in such a manner that it can pass freely off at one end while being sewed into the cloth. $l\ l$ are chains for feeding the cloth, having small teeth in one edge of them, shown in a part just under the foot $z$ of the cloth-holder. These chains are separated by a small gear, $m$, on the shaft $n$. $o$ is a ratchet-gear on the shaft $n$. $p$ is a dog attached to the feed-lever O to work in the teeth of the ratchet-gear $o$ and turn it when said lever is moved by the cam L. $p'$ is a spring to the dog $p$ to keep it in the teeth of the ratchet-gear $o$. $r$ is a roll or pulley for the feed-chains to pass over at one side. $s\ s$ are two points fastened into the spring $v$ on the shuttle-lever F, which pass into small holes in the shuttle for the purpose of moving it. On the back part of said points or pins $s\ s$ are projections $t\ t$, which pass successively against the projection $u$ in such a manner as to cause each one of the points $s\ s$ to move out from the shuttle when it comes near to the loop of the thread which the shuttle is going through, in such a manner that said points will not prevent the shuttle from passing freely through the loop.

At $c$ and $c'$ (Fig. 10) is shown a front and a side view of the eye of my needle, which consists of two hooks, one below and one above the opening, for the thread to pass into either one or the other of said hooks. One of these hooks is to carry the loop of the thread up through the cloth, and the other to carry said loop down through the cloth in another place, so that the shuttle can pass through said loop. These hooks may be made by first making a long eye in the needle, and then, half-way from one end to the other of said eye, making a gap or opening into it from one side of the needle, as shown in a side view at c', Fig. 10. I have the point of my needle incline toward the side which the hooks are on, for the purpose of making all the pressure of the cloth on the opposite side from the hooks to prevent said hooks from catching into the cloth. w is a piece of metal fastened into the end of the needle-arm D, having a slit cut in the lower end suitable to hold the needle, and a tapering screw cut on the outside for the nut y to screw onto to fasten the needle.

Having described the principal parts of my machine, I will now proceed to explain its operation.

In turning the main shaft B the needle h is made to move up and down by means of the cam H, operating the needle-bar D through the pin a, turning upon the shaft E. I will suppose that the shaft B has been thus turned until the needle has come to the position seen in Fig. 2. The same position of the needle is also shown in example 2, Fig. 7, where two thicknesses of the cloth Z are shown, and the thread is represented stretched on the under side of the cloth below the needle, as it would be after one stitch had been sewed and the shuttle had moved forward to its farthest point, drawing up the loop close around the thread N, which the shuttle had just passed through said loop. Next stage in the formation of the stitch is shown in example 3, Fig. 7. In this example the machine has been turned far enough to cause the thread-guide F to move from its first position back a little from the needle by its roll f, passing into the cavity J', to receive the thread and take it out of the way of the needle-point as it descends; also for the needle to pass down and the thread-guide to move the thread forward, wrapping it partly around the needle, as seen in example 1, Fig. 7, by means of the cam J, pressing against the roll f. The thread being held in this position the machine continues to turn until the opening in the eye of the needle has come up even with the thread thus pressed against the needle by the thread-guide and the thread passed into the eye, completing the example 3. Then by turning the machine further the needle is caused to move up, carrying the thread, which was just thrown into its eye to its highest position. Meantime the thread-guide has been withdrawn to its first position, the shuttle has moved back until the hole from which the thread comes is about even with the needle, and the cloth Z has been fed along far enough for a stitch by means of the cam L, moving the lever O, the dog p, the ratchet-gear o, the shaft n, and the small chain-gear m, which moves the chains l l, and the cloth with them, completing the position of example 4, last referred to. By turning a little farther the needle is moved downward, and at the same time the shuttle recedes in such manner as to draw the loop of the thread, which the needle holds above the cloth straight, so that said thread will not be liable to come under the point of the needle as it descends, completing example 5. Another movement of the machine causes the needle to pass down, the shuttle in the meantime receding sufficient to take up the slack thread of the loop above the cloth and in the eye of the needle as the needle passes down. When the needle reaches its lowest point and rises up a little, causing a loop to form on the side which the shuttle passes, the shuttle moves forward, so that the point of it passes through the loop, while one side of said loop is close in the upper hook of the needle, bringing the shuttle and needle to the position shown in example 6. The needle then rises up, and the shuttle goes forward in such manner as to take the loop out of the hook in said needle and bring the needle and shuttle to the position of example 7. By the shuttle's moving forward to its farthest point it will readily be seen that the loop which it has just passed through will be drawn up to the cloth and close around the thread coming immediately from the shuttle. To continue the operation as described a seam is formed which cannot be unraveled, having something of the appearance of a chain or loop stitch seam on one side and a back stitch on the other, as shown in a side, top, and bottom view in Fig. 9, where a side view of said seam is shown at example 1, a top view at example 2, and a bottom view at example 3. When the stitch is drawn up differently, so as not to draw the loop so tight above the cloth, a seam is formed, as shown in a side view at example 4 and a top view at example 5. The motion of the needle in these examples is given by the cam H through the pin a and the needle arm or lever D, and the motion of the shuttle is given by the cam I through the pin g and the lever F, turning on the stud d as a fulcrum. In Fig. 5 is shown the shuttle G complete, with a bobbin or thread wound upon the spindle j, the thread passing off of the spindle at q, the small tension-spring i, and the thread N, as it receives its tension by passing under the spring i, as seen in Fig. 3, and out of said shuttle as ready for use; also the back of the shuttle is shown at Fig. 5. The cloth is fed along by means of the chains l l, which receive their motion in the following manner: The cam L upon the main shaft B by turning moves the lever O up, and the dog p, attached to said lever, catches in the teeth of the ratchet-gear o, a part of which teeth are shown in Fig. 4, causing it and the shaft n to turn a little way round, where it is held by a small spring, b, until the lever O is drawn to its first position by the spring H. When the shaft n moves, the small chain-gear m on one end of it causes the chains l l to move with it. These chains pass through two grooves in the top of the table A, each side of the hole which the needle passes through, around the chain-gear m, and around the roll r, so as to have an endless motion. There are small teeth in the upper edge of said chains as they pass each side of the needle and under the cloth-holder z, which presses the cloth onto said chains by means of the spring w.

After having thus described my machine, what I claim as my invention, and desire to secure by Letters Patent, is,—

1. The method of taking up the slack thread above the cloth by means of the shuttle—that is, when the needle descends after having taken the thread up through the cloth and to its greatest distance above said cloth—the drawing down through the cloth the end of the thread connected with the shuttle by means of the shuttle receding from the needle as the needle descends, thereby preventing the liability of the thread getting under the point of the needle as said needle passes down into the cloth by thus keeping said thread straight, or nearly so, until said needle-point is sufficiently near said cloth that there is no further liability of the thread passing under it.

2. The formation of a seam of one thread which cannot be unraveled, of stitches each of which is made by having the loop or double of the thread passed through from one side to the other of the cloth and back again in another place to the first side of said cloth, and a loop formed by means of a hook-needle, and then by having the same thread of which said loop is formed passed through said loop, and the loop drawn up to the cloth around the thread thus passed through it by means of a shuttle, as herein specified, and illustrated in Figs. 7 and 9.

WILLIAM WICKERSHAM.

Witnesses:
W. H. WILLSON,
CHAS. W. LOVETT.